United States Patent Office 3,836,505
Patented Sept. 17, 1974

3,836,505
9-CARBOXYLIC NAPHTHOXAZOLES AND
PLASTICS BRIGHTENED THEREWITH
Bennett George Buell, Bound Brook, N.J., assignor to
American Cyanamid Company, Stamford, Conn.
No Drawing. Original application June 11, 1970, Ser. No.
45,595, now Patent No. 3,717,652. Divided and this
application Nov. 13, 1972, Ser. No. 305,771
Int. Cl. C08f 45/67; C08g 51/67
U.S. Cl. 260—45.8 N                    4 Claims

ABSTRACT OF THE DISCLOSURE

Naphthoxazoles characterized by the presence of a carboxylic function at the 9-position are provided. They are improved mass brighteners for molded plastics, particularly polyesters, since they absorb strongly in the UV region of 370–400 nanometers and do not sublime or mark off at high molding temperatures. They correspond to the formula

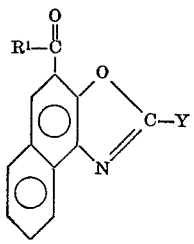

in which $R^1$ is the hydroxyl radical, or, a monovalent dehydro radical of an alcohol, a phenol, a primary amine or a secondary amine, said monovalent radical containing about 1–8 carbon atoms, and Y is a 2-naphthoxazolyl, or a 2-naphthoxazolylphenyl having a carboxylic acid function at the 9-position, a stilbyl, a 2-benztriazolylphenyl or a 2-naphthtriazolylphenyl radical, or a styryl, 4-cyanostyryl or 4-carboxystyryl radical.

---

This application is a divisional of application Ser. No. 45,595, filed June 11, 1970, now U.S. Pat. No. 3,717,652, issued Feb. 20, 1973.

This invention relates to naphthoxazole compounds and more particularly to certain naphth[1,2-d]oxazole derivatives characterized by the presence of a carboxylic function at the 9-position thereof. The invention includes the new 9-carboxylic naphthoxazoles, which are improved brighteners or optical bleaches for molded thermoplastic polymers, their methods of preparation, and improved plastics wherein they are distributed in brightening amounts.

The new naphthoxazoles are compounds having the formula (A)

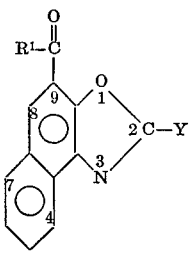

in which $R^1$ is the hydroxyl radical, or, a monovalent dehydro radical of an alcohol, a phenol, a primary amine or a secondary amine, in which case it contains from 1 to about 8 carbon atoms, and Y is a radical which, when linked at the 2-position of the 9-carboxyl-substituted naphthoxazole as in Formula (A), will form a brightening agent capable of absorbing light in the region of 370–400 nanometers. I have found that the four following radicals provide this function.

1. Radicals of the formula

in which $R^2$ is styryl, benztriazol-2-yl or naphthtriazol-2-yl.

2. Radicals of the formula

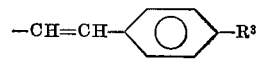

in which $R^3$ is hydrogen, cyano, or —$COR^1$ wherein $R^1$ is as defined above.

3,4. Radicals of the formulas

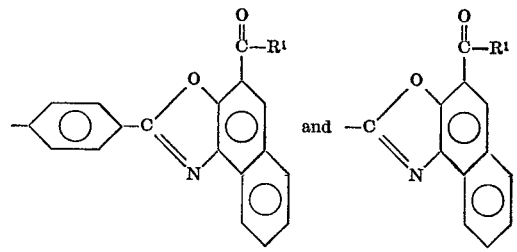

wherein $R^1$ is as defined above.

In addition to their characterizing light absorption, these compounds also form a group that can be prepared from the same common starting material. This is an important commercial advantage. The starting material is 4-amino-3-hydroxy-2-naphthoic acid, which is readily prepared from the 3-hydroxy-2-naphthoic acid of commerce. A preferred preparation is by coupling a phenyldiazonium salt to the 3-hydroxy-2-naphthoic acid followed by reduction with sodium hydrosulfite.

Synthesis of a brightener containing a free carboxylic acid at the 9-position of the naphth[1,2-d]oxazole radical or radicals is then completed by an appropriate method as described below and illustrated in the accompanying examples. Conversion of this group to the corresponding ester or amide may be accomplished by any standard acylation or amidation procedure, but the brightener is preferably first converted into its acid chloride which is reacted with at least a stoichiometrically equivalent amount of an alcohol or a primary or secondary amine. Best results have been obtained with alcohols and amines containing from 1 to 8 carbon atoms such as the following.

Alcohols suitable for the practice of this invention are: alkanols of 1 to 8 carbon atoms such as methanol, ethanol, 2-methoxyethanol, 2-ethoxyethanol, propanol, isopropanol, 1-butanol, isobutanol, 1-pentanol, 2-methylpentanol, and 5-ethylhexanol; alkenols such as allyl alcohol; cyclic alkanols and cyclic alkenols of 1 to 8 carbon atoms such as cyclopentanol, cyclohexanol and 2-cyclohexen-1-ol; phenols such as phenol itself, o-, m- or p-anisole, 2-, 3- or 4-hydroxytoluene or other substituted phenols in which hydroxy is the only substituent having an action hydrogen; dihydric and trihydric alcohols such as ethylene glycol, propylene glycol and glycerine.

Primary amines suitable for the practice of this invention are: aliphatic amines such as normal, branched and substituted amines of 1 to 8 carbon atoms and arylamines of the benzene series such as:

| | |
|---|---|
| methylamine | 3-[2-ethoxy(2-ethoxy)] propylamine aniline |
| ethylamine | |
| isopropylamine | o-, m- and p-anisidine |
| n-propylamine | o-, m- and p-chloroaniline |
| n-butylamine | o-, m- and p-cyanoaniline |
| isobutylamine | o-, m- and p-toluidine |
| sec-butylamine | o-, m- and p-trifluoro- aniline |
| n-octylamine | |
| n-dodecylamine | o-, m- and p-aminobenzoic acid |
| n-octadecylamine | |
| ethanolamine | o-, m- and p-aminobenzoic monoesters |
| isopropanolamine | |
| cyanoethylamine | o-, m- and p-aminobenzoic monamides |
| 2-carbamoylethylamine | |

Secondary amines suitable for the practice of this invention are: aliphatic, cycloaliphatic and heteroaromatic amines of 1-8 carbon atoms such as:

dimethylamine
diethylamine
di(isopropyl)amine
bis(2-methoxyethyl)amine
bis(2-cyanoethyl)amine
bis(2-hydroxyethyl)amine
bis(2-carbamoylethyl)amine
morpholine
pyrrolidine
piperidine
N-ethyl-N-(2-carbamoylethyl)amine
N-(2-cyanoethyl)-N-(2-carbamoylethyl)amine
N-(2-cyanoethyl)-N-(2-hydroxyethylamine)
N-Methyl-2-hydroxyethylamine
N-Methyl-N-(2-carbamoylethyl)amine
N-(2-hydroxyethyl)-N-(2-carbamoylethyl)amine A preferred subclass of compounds is represented by Formula I:

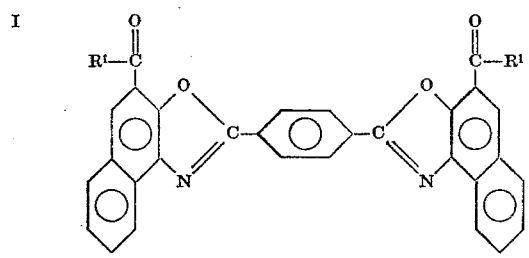

wherein $R^1$ is defined above and illustrated in Table 1 of the examples. These compounds are prepared by the reaction of two moles of 4-amino-3-hydroxy-2-naphthoic acid with one mole of terephthalaldehyde, followed by oxidation with nitrous acid *in situ* to give the 1,4-phenylene-bis-(naphth[1,2-d]oxazole-9-carboxylic acid). The free acid, one of the brightener compounds of this invention, is converted to its ester or amide by standard acylation or amidation procedures, as stated above and illustrated in the examples.

A second preferred subclass of compounds is represented by Formula II:

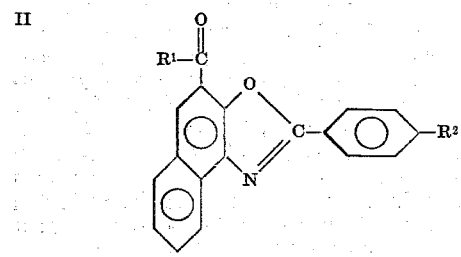

wherein $R^1$ is as defined above and $R^2$ is styryl, benztriazolyl or naphthtriazolyl. These are illustrated in Table II. These compounds are prepared by reaction of 4-amino-3-hydroxy-2-naphthoic acid with an acid chloride followed by cyclization of the resulting amide with acid reagents such as polyphosphoric acid or a dodecylbenzene sulfonate. This gives the 2-stilbyl-, 2-benztriazolylphenyl-, or 2-naphthtriazolylphenylnaphth[1,2 - d]oxazole - 9 - carboxylic acid which are compounds of this invention. These can be converted to ester or amide derivatives of the 9-carboxylic acid by standard acylation or amidation procedure, as illustrated in the examples.

A third preferred subclass of compounds is represented by Formula III:

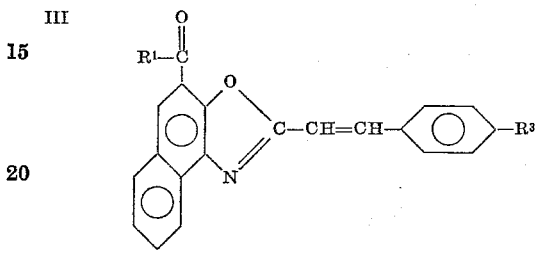

wherein $R^1$ is as defined above and $R^3$ is hydrogen, cyano or —$COR^1$. These compounds, illustrated in Table III, may be prepared in either of two ways:

1. The reaction of 4-amino-3-hydroxy-2-naphthoic acid with a cinnamaldehyde

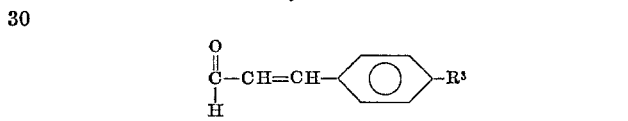

to form a cinnamal Schiff base followed by oxidative cyclization. $R^3$ is defined as above.

2. Acylation of 4 - amino - 3 - hydroxy - 2 - naphthoic acid with acetic anhydride and the product cyclized with acid catalyzed reactions to give a new intermediate, 2-methylnaphth[1,2-d]oxazole-9-carboxylic acid. This is condensed with a compound

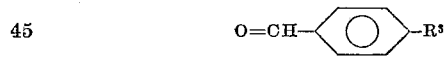

wherein $R^3$ is defined as above, in the presence of an acid catalyst to give the 2-(p-$R^3$-styryl)-naphth[1,2-d] oxazole-9-carboxylic acid which is a compound of this invention. The free acid can be converted to an ester or amide by standard acylation or amidation procedures as illustrated by example.

A fourth preferred subclass of compounds is represented by Formula IV:

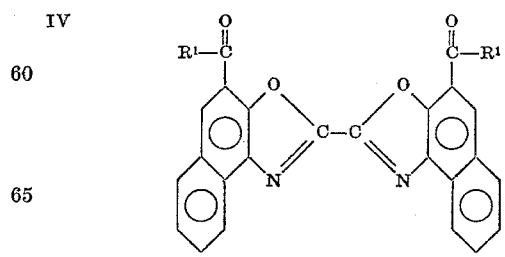

wherein $R^1$ is as defined above. These are illustrated in the Examples and Table IV.

These are synthesized by condensation of 4-amino-3-hydroxy-2-naphthoic acid with glyoxal to give the bis-dihydronaphthoxazole. This is oxidized with sodium hypochlorite to the sodium salt of the bis-naphthoxazole, which is converted to the free acid or to the acid chloride, followed by reaction with an alcohol or a primary or secondary amine.

In converting the free carboxylic acid compounds of preferred subclass I, II, III and IV, the carboxylic acid may be reacted with an excess of thionyl chloride serving as both solvent and chlorinating agent. The isolated acid chloride in a solvent such as xylene, benzene or pyridine, is reacted with alcohol or with a primary or secondary amine to form a carboxylic ester or amide, respectively.

The four classes of compounds I, II, III and IV are useful as brighteners of thermoplastics such as polyester, poly(vinyl chloride), polypropylene, polyethylene, poly(methyl methacrylate) and polyamides such as nylons. A preferred use is in polyester dope or melt composition used for spinning, extruding or moulding into fibers, films, tubing, and other forms of articles. About 0.005 to 1.0 weight percent of the brightener compound is incorporated by mixing in molten polyester at about 280–290° C., and thereafter shaping and cooling. A strong whitening effect is observed in the shaped polyester as well as a brilliant blue fluorescence. The brightener compounds of this invention are distinct for their lack of sublimation from such substrates.

The advantage of incorporating the compounds of this invention in the plastic is the permanance of the brightening compared to after treatment of the surface with a brightener.

Most of the brightener compounds of this invention absorb strongly in the UV region of 370–400 nanometers as contrasted with 340–369 nanometers for other brighteners. This gives a much higher whitening strength in polyester both as measured by instruments and as seen by the eye.

The lower absorbing members may find use as donor components for brightener systems which depend on transfer of energy from donor brightener to acceptor brightener in molten polyester masses.

The compounds having free carboxylic acid groups have affinity for cotton and other cellulosic textile fibers.

The invention will be further described and illustrated by the following specific examples, wherein the preparation and testing of representative compounds is described and wherein wavelengths are expressed as "nm." (nanometers). In the tables of these examples the term "Whiteness" indicates the test results obtained by the following procedure.

A chip of polyester (polyethylene terephthalate) containing the brightener compound to be evaluated, is prepared as follows. The polyester is dry-blended with 0.04% by weight of the brightener in a ball mill for 24 hours. The coated flakes are dried in an oven for 24 hours at 212° F. The dried flakes are placed in a cavity mold. The mold is placed in a hydraulic press heated at 575° F. and subjected to a pressure of 30 tons on a 4.5 inch diameter for 2 minutes. This forms a chip of 45 to 46 mils thickness. Measurements of whiteness of the polyester chip are made on a Hunterlab Color and Color Difference Meter, Model D-25M equipped with a 45°–0° optical unit with circumferential illumination and direct reading whiteness module. This instrument makes precise measurements of the color of flat surfaces as they appear in daylight. Values of color are read directly from digital dials. The degree of whiteness is based on the relationship of the lightness measurement to the yellowness-blueness measurement and is expressed as:

$$W = 0.01 L(L - 5.7b)$$

where

W is whiteness
L is lightness
b is yellowness-blueness

A control chip lacking any brightener compound has a whiteness of about 58.3.

EXAMPLES 1–6

Type Formula

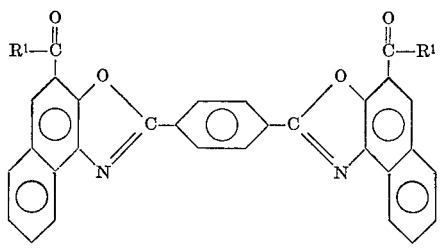

TABLE 1

| Example number | R¹ = | Melting point, °C. | Whiteness |
|---|---|---|---|
| 1 | —OH | >300 | 79.4 |
| 2 | —O(CH₂)₃CH₃ | 248–9 | 104 |
| 2-a | —OCH₃ | 346–350 | 88.9 |
| 3 | —N(CH₂CH₂OCH₃)₂ | 208–9 | 93.0 |
| 4 | —N(CH₂CH₂CN)₂ | 337–9 | 96.5 |
| 5 | —NH(CH₂)₃O(CH₂)₂OC₂H₅ | 293–5 | 94.4 |
| 6 | —NH(CH₂·CH(CH₃)₂ | >310 | 90.4 |

These compounds are prepared by the reaction of two moles of 4-amino-3-hydroxy-2-naphthoic acid with one mole of terephthalaldehyde, followed by oxidation with nitrous acid *in situ* to give the 1,4-phenylene-bis-(naphth[1,2-d]oxazole-9-carboxylic acid). The free acid, one of the brightener compounds of this invention, is converted to its ester or amide by standard acylation or amidation procedures, as illustrated in the examples.

EXAMPLE 1

Preparation of 1,4-bis(9-carboxynaphth[1,2-d]oxazol-2-yl)benzene

A mixture of 8.12 g. (0.04 mole) of the known compound, 4-amino-3-hydroxy-2-naphthoic acid, and 200 ml. acetic acid is heated to 50° C. with stirring. Then, 2.68 g. (0.02 mole) terephthaldialdehyde is added and the mixture heated to boiling. It is cooled to 15° C. and 2.90 g. (0.04 mole) sodium nitrite added gradually. During 2 hours of stirring the mixture gradually changes from tan to yellow. The mixture is heated to 100° C. becoming still lighter in color. It is filtered warm and the precipitate washed with acetic acid and with water. Dried at 60° C., it gives 9.0 g. of product, m.p. 300° C. The infrared spectrum confirms the product.

A purified sample prepared by charcoal treatment of a solution of the disodium salt and precipitation as the free acid by addition of hydrochloric acid, has an absorptivity at 380 nm. of 102.2 In addition to its application in polyester melt or mass brightening, it brightens cotton.

EXAMPLE 2

Preparation of dibuty 1,4-phenylene-bis(naphth[1,2-d]oxazol-2-yl-9-carboxylate)

A mixture of 5.00 g. of the product of Example 1 and 100 ml. of thionyl chloride is heated with stirring. The excess thionyl chloride is removed and the residue taken up in 150 ml. pyridine and 5 ml. n-butanol. The mixture is heated to reflux.

Most of the pyridine is distilled off. It is cooled, the product filtered, washed with pyridine, water, and dried at 60° C. There is obtained 4.45 g. product, m.p. 242–246° C.

The product is recrystallized from a monochlorobenzene-butanol mixture, chromatographed on alumina from chloroform and recrystallized again from MCB-butanol. It melts at 248–249° C. and shows a $a_{380\ nm} = 113.8$ in its U.V. spectrum.

When methanol is substituted for n-butanol in this preparation the corresponding dimethyl ester is obtained. Its melting point and whiteness are listed in Table 1.

EXAMPLE 3

Preparation of 1,4-bis{[9-di(2-methoxyethyl)carbamoyl]naphth[1,2-d]oxazol-2-yl}benzene A mixture of 10.0 g. of the product of Example 1 and 200 ml. thionyl chloride is refluxed for 24 hours. The excess thionyl chloride is then completely removed by vacuum distillation to give a residue that shows the correct IR spectrum for the acid chloride of Example 1. The residue is taken up in 250 ml. pyridine and 15 ml. bis-(2-methoxyethyl)amine is added. The mixture is refluxed one half hour, cooled, poured into 1 liter of ice and water and then filtered. Finally after washing with water, the product is dried in vacuo at 60° C. Final weight=9.60 g., m.p. 188–192° C. The IR spectrum confirms the product. Chromatography on alumina from CHCl₃ and recrystallization from methoxyethanol gives 6.25 g. of pure product, 208.5–209.5° C.

EXAMPLES 4–6

Products wherein other amines are substituted for the bis-(2-methoxyethyl)amine of Example 3 are prepared by the procedure of that example. Representative amines, and the melting points and Hunterlab meter whiteness values of the products obtained, are listed in Table 1.

EXAMPLES 7–15

Type Formula

II

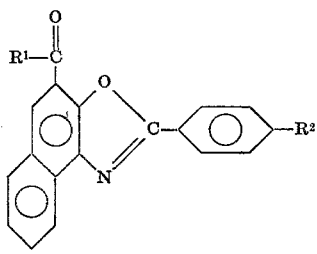

These compounds are prepared by reaction of 4-amino-3-hydroxy-2-naphthoic acid with an acid chloride followed by cyclization of the resulting amide with acid reagents such as polyphosphoric acid or a dodecylbenzene sulfonate. This gives the 2-stilbyl-2-benzotriazolylphenyl-, or, 2 - naphthotriazolylphenyl - naphth [1,2-d]oxazole-9-carboxylic acid which are compounds of this invention. These can be converted to ester or amide derivatives of the 9-carboxylic acid by standard acylation or amidation procedure, as illustrated in the examples.

EXAMPLE 7

Preparation of 9-carboxy-2-stilbylnaphth[1,2-d]oxazole

A mixture of 3.72 g. of the amide prepared by reaction of 1 mole 4-amino-3-hydroxy-2-naphthoic acid with 4-stilbenecarbonyl chloride is cyclized in 500 ml. 1,2,4-trimethylbenzene containing 1 g. ammonium dodecylbenzene sulfonate by heating at reflux for twenty hours, removing water as formed. The product is collected and dried. On recrystallization from xylene, 2.5 g. product is obtained, m.p. 292–294° C. An analytical sample melts at 302–303.5° C. Its U.V. spectrum shows an absorptivity at 375 nm. of 115.5 and at 395 nm. of 101.3. Whiteness value is given in Table II.

EXAMPLE 8

A mixture of 1 gram of the product of Example 7 and 25 ml. of thionyl chloride is heated with stirring. The excess thionyl chloride is removed and the residue is taken up in 100 ml. of pyridine containing 5 ml. of n-butanol. The mixture is heated under reflux until esterification is complete after which the pyridine is distilled off. The residue is cooled, washed with pyridine and dried. An analytical sample is obtained by the purification procedure described in Example 2.

EXAMPLES 9–10

Preparation of 9-N-phenylcarbamyl-2-stilbylnaphth-[1,2-d]oxazole

A mixture of 4.36 g. 4-stilbenecarbonyl chloride and 5.00 g. 1-amino-3-N-phenylcarbamyl-2-naphthol is heated in pyridine solution on the steam bath for a half hour. The product is isolated by cooling, drowning in ice water and filtering. There is obtained 9.8 g. of the crude amide. The crude product, 8.72 g. is mixed with 1.11 g. boric acid and heated at 240° C. for twenty minutes. After cooling, the fusion product is ground in a mortar and recrystallized several times from methyl Cellosolve. The product melts at 238–239° C. The U.V. spectrum shows a $a_{370\ nm.}$=115.5. An analytical sample shows a $a_{370\ nm.}$=121.2.

Maximum emission peaks occur at wavelengths of 434 nm. and 457 nm. This product brightens polyethylene, polyvinyl chloride and polyester plastics.

Substitution of 1-amino-3-n-butylcarbamyl-2-naphthol in this preparation gives 9-n-butylcarbamyl-2-stilbylnaphth[1,2-d]oxazole, the melting point and whiteness of which are listed in Table 2.

EXAMPLE 11

Preparation of 2-(naphtho[1,2-d]triazol-2-ylphenyl)-9-carboxyl naphth[1,2-d]oxazole The acid chloride of the known 2-(4-carboxyphenyl) naphthotriazole is prepared by a standard procedure. A solution of 6.31 g. of this chloride in 200 ml. xylene is combined with a solution of 4.14 g. 4-amino-3-hydroxy-2-naphthoic acid in 400 ml. xylene and 50 ml. dimethylformamide and heated at reflux for twenty hours, concentrated and precipitated with petroleum ether. The product is filtered and dried giving 8.68 g. of crude product. Recrystallization from 1200 ml. o-dichlorobenzene gives 7.21 g., m.p. 357–360° C. of amide. To cyclize this amide, 7.00 g. is taken up in 200 g. polyphosphoric acid and the mixture is heated at 183° C. for four hours. The product is isolated by cooling and drowning in water. After repeated recrystallization from monochlorobenzene, it melts at 352–354° C. Its U.V. spectrum: a $a_{370\ nm.}$=108.6. Its whiteness value in polyester melt is given in Table 2.

EXAMPLES 12–13

Preparation of 2-(naphtho[1,2-d]triazol-2-ylphenyl)-9-carbutoxy naphth[1,2-d]oxazole The acid chloride of Example 11 is prepared by standard procedure. Then 1.50 g. of the chloride is combined with 25 ml. of pyridine and 1.40 ml. of n-butanol. The solution is refluxed 12 hours, cooled and filtered. The

TABLE 2

| Example number | R¹ | R² | Melting point, °C. | Whiteness |
| --- | --- | --- | --- | --- |
| 7 | —OH | Styryl | 302–3.5 | 98.4 |
| 8 | —OC₄H₉ | ——do—— | 142.7 | 85.6 |
| 9 | —NHC₆H₅ | ——do—— | 238–9 | 84.6 |
| 10 | —NHC₄H₉ | ——do—— | 206.8 | 91.7 |
| 11 | —OH | Naphth[1,2-d]triazol-2-yl | 343–5 | 64.2 |
| 12 | —OC₄H₉ | ——do—— | 240–2 | 100.7 |
| 13 | —N(CH₂CH₂OCH₃)₂ | ——do—— | 225–6 | 92.6 |
| 14 | —OC₄H₉ | Benztriazol-2-yl | 216–7 | 89.7 |
| 15 | —N(CH₂CH₂OCH₃)₂ | ——do—— | 196–8 | 86.8 | crude yield is 1.34 g. Repeated recrystallization from n-butanol gives 0.61 g., m.p. 240–242° C.

U.V. spectrum: a $_{370\ nm.}$=106.1; a $_{390\ nm.}$=96.7

Substitution of bis-(2-methoxyethyl)amine for the n-butanol gives 2-(naphtho[1,2-d]triazol-2-ylphenyl)-9-[di-(2-methoxyethyl)]carbamoylnaphth[1,2 - d]oxazole, the properties of which are described in Table 2.

EXAMPLES 14–15

Preparation of n-butyl 2-(2H-benzotriazol-2-ylphenyl)-naphth[1,2-d]-oxazole-9-carboxylate

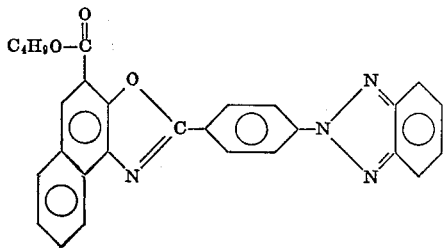

A. Preparation of 4-(2H-benzotriazol-2-yl)-benzoic acid: To 72.4 g. m-phenylenediamine dihydrochloride in a liter of water is added a solution of p-carboxyphenyl-diazonium chloride prepared by diazotizing 54.8 g. p-aminobenzoic acid by standard methods in dilute hydrochloric acid to give a liter of clear solution. With stirring, a saturated solution of sodium acetate is added slowly until the mixture is neutral to Congo Red indicator paper. When coupling is complete, the product is filtered and taken up in one liter of 1/1 aqueous pyridine. Triazolization is effected with 60 g. cupric acetate followed by 25 g. cupric sulfate. There is obtained 89.4 g. 4-(5-amino-2H-benzotriazol-2-yl)-benzoic acid which is deaminated as follows: 12.7 g. of the latter is dissolved in aqueous alkali, 3.5 g. sodium nitrite added, and the mixture diazotized by pouring into dilute hydrochloric acid solution at 10–15° C. To the mixture, 50 ml. hypophosphorous acid is added. The whole is stirred for 72 hours as nitrogen slowly evolves. The product (A) is filtered, washed with water and dried to give 11.12 g. m.p. 318–320° C.

B. Preparation of 2 - (2H-benzotriazol-2-ylphenyl)-naphth[1,2-d]-oxazole-9-carboxylic acid: Product (A) is converted to its acid chloride by use of thionyl chloride in standard procedure. The acid chloride, 0.01 mole is added to 2.10 g. 4-amino-3-hydroxy-2-naphthoic acid dissolved in 50 ml. pyridine. After 1 hour of reflux, the amide product is isolated by cooling and precipitating with water. It is cyclized to the oxazole by heating in orthodichlorobenzene with a catalytic amount of ammonium dodecylbenzenesulfonate.

C. Esterification to the butyl carboxylate: Product (B), 2.55 g. is heated with 5 ml. n-butanol in 250 ml. xylene containing a catalytic amount of dodecylbenzenesulfonic acid. After 24 hours of reflux with water separator attached, the product is isolated. Purification is effected by recrystallizing from orthodichlorobenzene-butanol mixtures, chromatography on alumina from chloroform and recrystallization from n-butanol. The product melts at 216–217° C. and is confirmed by infra red spectrum and elemental analysis. Substitution of bis-(2-methoxyethyl) amine for the n-butanol gives the corresponding amide.

EXAMPLES 16–24

Type Formula

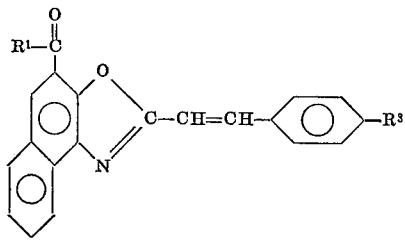

TABLE 3

| Example number | R¹ | R² | Melting point, ° C. | Whiteness |
|---|---|---|---|---|
| 16 | —OH | —H | 270–2 | 88.0 |
| 17 | —OCH₃ | —H | 123.7 | 83.2 |
| 18 | —2-ethylhexoxy | —H | 104.7 | 77.6 |
| 19 | —NHC₆H₅ | —H | 215–20 | 64.3 |
| 20 | —OH | —COOH | 350–1 | 86.2 |
| 21 | —OC₄H₉ | —COOC₄H₉ | 91–2 | 91.8 |
| 22 | —NHC₄H₉ | —CONHC₄H₉ | 203–4 | 83.7 |
| 23 | —N(CH₂CH₂OCH₃)₂ | —CON(CH₂CH₂OCH₃)₂ | 102.5 | 78.9 |
| 24 | —OC₄H₉ | —CN | 201.2 | 90.3 |

The compounds of Formula III may be prepared by either of two ways:

1. The reaction of 4-amino-3-hydroxy-2-naphthoic acid with a cinnamaldehyde

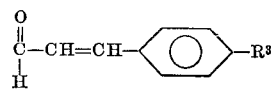

to form a cinnamal Schiff base followed by oxidative cyclization. R³ is defined as in Table 3.

2. Acylation of 4-amino-3-hydroxy-2-naphthoic acid with acetic anhydride and the product cyclized with acid reagents to give a new intermediate 2-methyl-naphth[1,2-d]oxazole-9-carboxylic acid. This is condensed with a compound

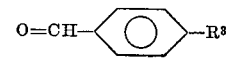

wherein R³ is defined as above, in the presence of an acid catalyst to give the 2-(p-R³-styryl)-naphth[1,2-d]oxazole-9-carboxylic acid which is a compound of this invention. The free acid can be converted to an ester or amide by standard acylation or amidation procedures as illustrated by the examples.

EXAMPLES 16-19

Preparation of 9-carboxy-2-styrylnaphth[1,2-d]oxazole

A mixture of 10.1 g. 4-amino-3-hydroxy-2-naphthoic acid, 6.4 g. cinnamaldehyde, 200 ml. acetic acid and 5 ml. of 5N hydrochloric acid is heated to 90° C. and allowed to cool to room temperature with stirring. Sodium nitrite, 3.5 g., is added and after five minutes of stirring, 1.0 g. more added. The mixture is heated to 50° C. and allowed to cool. The product is filtered, washed with acetic acid, then water, and dried at 60° C. There is obtained 8.91 g. of material, m.p. 262–266° C. having the correct IR spectrum.

An analytical sample melts at 270–272° C. The whiteness value is in Table 3.

In addition to melt brightening of polyester, this brightener is also useful as a donor component for brightener systems which depend on transfer of energy from donor brightener to acceptor brightener in molten polyester masses.

Portions of this product are converted into the corresponding esters or amides by the procedures described in Examples 2 and 3 respectively. The melting points and whiteness values of the products are shown in Table 3.

EXAMPLE 20

Preparation of 2-(p-carboxystyryl)-9-carboxynaphth[1,2-d]oxazole (a) Preparation of the intermediate 9-carboxy-2-methylnaphth[1,2-d]oxazole: A mixture of 6.09 g. 4-amino-3-hydroxy-2-naphthoic acid, 3.10 acetic anhydride, 150 ml. xylene and 2 drops pyridine is heated at gentle reflux for a half hour. A solution of ammonium dodecylbenzene sulfonate prepared from 5 ml. dodecylbenzene sulfonic acid in 100 ml. xylene is added. The mixture is heated at reflux with a water separator attached, until no more water comes over. The mixture is cooled, filtered and the product washed with benzene. It is dried at 60° C. to give 6.48 g. product. Recrystallization from 300 ml. orthodichlorobenzene gives 5.46 g. product m.p. 295–295.5° C.

(b) Preparation of 2 - (p-carboxystyryl)-9-carboxynaphth[1,2-d] oxazole: A solution of ammonium dodecylbenzene sulfonate is prepared by boiling a mixture of 2 ml. dodecylbenzene sulfonic acid, 2 ml. of conc. ammonium hydroxide and 300 ml. 1,2,4-trimethylbenzene until all the water has been removed. To this solution is added 4.54 g. of the product of (a) and 3.20 g. terephthalaldehydic acid and the mixture is refluxed for about 3 hours until all of the water has been removed. The mixture is cooled, the precipitate washed with benzene and dried at 60° C. There is obtained 6.91 g. of olive-green solid having a confirmatory IR spectrum. Two recrystallizations from diglyme give a yellow solid, m.p. 350–351° C.

EXAMPLE 21

Preparation of 2-(p-carbutoxystyryl)-9-carbutoxynaphth[1,2-d]-oxazole

A mixture of 1.00 g. of the product of Example 20(b) and 40 ml. thionylchloride is refluxed for two hours. The excess thionyl chloride is removed in the usual manner and the residue is taken up in 40 ml. of pyridine and 2.0 ml. of freshly distilled n-butanol. After an hour of reflux the product is isolated by cooling and drowning in water. The product is filtered, dried and chromatographed on alumina from chloroform. It is recrystallized from n-hexane to give a light yellow product, m.p. 91–92° C.

The U.V. spectrum shows a $_{380\ nm}=81.4$.

The whiteness value is in Table 3.

This product not only brightens polyester but is also excellent for brightening polyethylene and polyvinylchloride. It also brightens nylon.

EXAMPLES 22–24

Other products containing the substituents shown in Examples 22 and 23 of Table 3 are prepared by the same procedure as in Example 21 except for the use of the respective amine in place of n-butanol.

For Example 24 of Table 3, p-cyanocinnamaldehyde is used in Example 16 in place of cinnamaldehyde, followed by esterification by the method of Example 21.

EXAMPLES 25–30

Type Formula

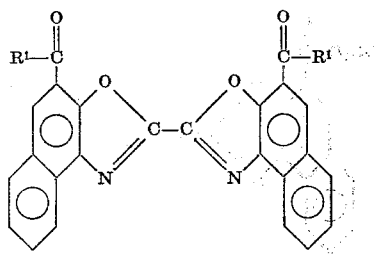

TABLE 4

| Example number | R¹ | Melting point, °C. | Whiteness |
|---|---|---|---|
| 25 | —OH | >390 | 74.2 |
| 26 | —OCH₃ | 359–360 | 101.1 |
| 27 | —OC₄H₉ | 228–9 | 98.2 |
| 28 | —NHC₆H₅ | >375 | 94.2 |
| 29 | —NH(CH₂)₃N(CH₃)₂ | 284–7 | 63.0 |
| 30 | —NHC₂H₅ | 367–8 | 96.5 |

These are synthesized by condensation of 4-amino-3-hydroxy-2-naphthoic acid with glyoxal to give the bis-dihydronaphthoxazole. This is oxidized with sodium hypochlorite to the sodium salt of the bis-naphthoxazole, which is converted to the free acid or to the acid chloride, followed by reaction with an alcohol or a primary or secondary amine.

EXAMPLE 25

Preparation of 2,2'-bis(9-carboxynaphth[1,2-d]oxazole)

A. Preparation of 2,2'-bis(2,3-dihydro - 9 - carboxynaphth[1,2-d]oxazole): A mixture of 20.3 g. 4-amino-3-hydroxy-2-naphthoic acid, 250 ml. glacial acetic acid, and 7.36 g. 40% glyoxal is heated at 34–35° C. for 8 hours. The product is filtered, washed with methanol, pressed between filter paper and dried in vacuo over potassium hydroxide pellets. Yield is 15.99 g., m.p. 224° C. (dec.). Intense —NH— absorption is shown at 3250 cm.⁻¹ in the infra red spectrum.

B. Preparation of disodium 2,2'-bis(naphth[1,2-d]oxazole-9-carboxylate): A solution of 8.56 g. of Product A is mixed with 400 ml. diglyme, 200 ml. water and 14 ml. 5N sodium hydroxide solution. It is cooled to 15° C. and 48 g. of 12% sodium hypochlorite solution is added over 15 minutes. Stirring is continued for 15 minutes and the excess hypochlorite destroyed with saturated sodium hydrosulfite solution to a negative test on starch iodide paper. This disodium salt product is filtered, partially dried by stirring with 50 ml. methanol and dried by heating in a vacuum oven at 100–105° C. Yield is 5.79 g. having a $_{375\ nm}=71.0$.

C. Preparation of 2,2'-bis(9-carboxynaphth[1,2-d]oxazole): A 1 g. sample of the product from part B above is dissolved in 700 ml. of hot water and the solution is filtered. With stirring 2 ml. of 5N hydrochloric acid is added to the filtrate and after digesting ½ hour on the steam bath the product is filtered. It is drained and washed with small portions of water and drained on the funnel over night. Then it is slurried in acetone to get it into the form of a yellow powder, and it is dried at 60° C. to give 0.82 g., m.p. >390° C. The IR spectrum confirms the product. Maximum emission peaks occur at wavelengths of 433 nm. and 455 nm.

EXAMPLE 26

Preparation of dimethyl 2,2'-bis(naphth[1,2-d]oxazole-9-carboxylate)

A mixture of 2.15 g. of the product of Example 25B with 40 ml. of benzene and 50 ml. of thionyl chloride is refluxed for four hours. The solvents are removed by concentration under vacuo and the acid chloride remaining as the residue is taken up in 50 ml. of pyridine and 6 ml. of methanol. This mixture is refluxed for three hours, cooled and filtered. The yellow precipitate is washed with methanol, water and finally methanol again. It is dried at 60° C. and then recrystallized from trichlorobenzene to obtain 1.54 g. of the product, m.p. 359–360° C. The IR spectrum shows sharp absorption at 1710 cm.$^{-1}$ and the U.V. spectrum shows a $_{379\ nm}$=90.3. Maximum U.V. emission peaks occur at wavelengths of 433 nm. and 456 nm.

EXAMPLE 27

Preparation of dibutyl 2,2'-bis(naphth[1,2-d]oxazole-9-carboxylate)

A mixture of 2.34 g. disodium 2,2'-bis(naphth[1,2-d]oxazole-9-carboxylate) prepared in Example 25B, 50 ml. benzene and 50 ml. thionyl chloride is heated at reflux for four hours. The solvent is removed under vacuo and residual thionyl chloride flushed out with benzene twice under vacuo. The acid chloride product, identified by IR absorption at 1730 cm.$^{-1}$, is taken up in a solution of 6 ml. butanol in 50 ml. pyridine. The mixture is heated at reflux for three hours. On cooling, the dibutyl ester product precipitates. It is filtered, washed with methanol, with water and again with methanol. Dried at 60° C. it gives 2.37 g., m.p. 222–232° C. Recrystallized from monochlorobenzene and then from n-butanol containing 10% monochlorobenzene, there is obtained 1.59 g., m.p. 228–229° C. IR spectrum shows absorptivity at 1710 cm.$^{-1}$. U.V. spectrum shows a $_{377\ nm.}$=88.6.

EXAMPLES 28–30

Preparation of 2,2-bis-(naphth[1,2-d]oxazole-9-carboxanilide)

A mixture of the acid chloride prepared by the method of Example 27 from 2.52 g. of the disodium salt prepared by the procedure of Example 25B is taken up in a solution of 2 ml. aniline in 50 ml. pyridine. The mixture is heated at reflux for one and one-half hours. The whole is cooled, the product filtered, washed with water, methanol, and dried at 60° C. There is obtained 2.73 g. of the bis anilide product, m.p. 378° C. Its IR spectrum shows absorptivity at 1670 cm.$^{-1}$. Recrystallized twice from trichlorobenzene and dried at 180° C. in vacuo, there is obtained 1.87 g. product having as U.V. spectrum a $_{383\ nm}$= 59.4.

Other bis-amides are prepared by the same procedure and are shown as Examples 29 and 30 in Table 4.

EXAMPLE 31

Evaluation of sublimation and "mark-off" fastness of brightener compounds

A 6-layer sandwich is prepared with the following layers in contact with each other.

1. Aluminum foil
2. Unbrightened polyester fabric
3. Fine fiber glass fabric
4. A polyester chip containing 0.04%, by weight of the individual brightener compound under test
5. Unbrightened polyester fabric
6. Aluminum foil The sandwich is placed in a heated chamber (scorch tester) at 430° F. for 1 minute. The sublimation layer, number two, which receives brightener from the chip through the fiber glass fabric by sublimation, and the "mark-off layer," number five, which receives brightener from contact with the chip are then inspected under ultraviolet light and a visual observation is made as to transfer of brightener from the chip at the high temperature.

The results of tests conducted on brightener compounds of this invention and some prior art brighteners are given in Table 5 and show the relatively low sublimation tendence of the brightener compounds of the present invention.

TABLE 5

| | Sublimation | Mark-off |
|---|---|---|
| Brightener compound: | | |
| Ex. 2, Table 1 | None | None. |
| Ex. 9, Table 2 | do | Do. |
| Ex. 12, Table 2 | do | Trace. |
| Ex. 16, Table 3 | do | None. |
| Ex. 17, Table 3 | do | Slight. |
| Ex. 21, Table 3 | do | Do. |
| Ex. 18, Table 3 | Very slight | Moderate. |
| Ex. 26, Table 4 | None | None. |
| Prior art compounds: | | |
| 2-styrylnaphth[1,2-d]-oxazole | Heavy | Heavy. |
| 2-(p-carbomethoxystyryl)-5,6-dimethylbenzoxazole | do | Very heavy. |
| 2-(3-chlorostyryl)-naphth-[1,2-d]oxazole | Very heavy | Heavy. |
| 2-(6-methylbenzoxazole-2-yl-vinyl)benzoxazole | Heavy | Very heavy. |
| 2-stilbylnaphth[1,2-d]-oxazole | do | Heavy. |
| 2,2'-bis(naphth[1,2-d]-oxazole) | Moderate | Do. |

I claim:

1. A molded thermoplastic polymer having uniformly incorporated therein brightening amounts, within the range of about 0.0005 to about 1 weight percent, of a 9-carboxylic naphthoxazole of the formula

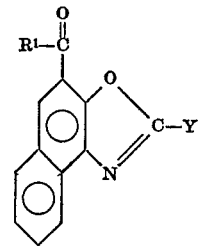

wherein Y is a member of the group consisting of and in which $R^2$ is benztriazol-2-yl or naphthtriazol-2-yl, and $R^1$ is a member of the group consisting of the hydroxyl radical and a monovalent dehydro radical of an alcohol, a phenol, a primary amine and a secondary amine, said monovalent radical containing 1 to about 8 carbon atoms.

2. A polymer composition according to Claim 1 wherein the 9-carboxylic naphthoxazole is dibutyl 1,4-phenylene-bis(naphth[1,2-d]oxazol-2-yl-9-carboxylate).

3. A polymer composition according to Claim 1 wherein the 9-carboxylic naphthoxazole is 2 - (naphtho[1,2-d]triazol-2-yl-phenyl)-9-carbutoxy naphth[1,2-d]oxazole.

4. A polymer composition according to Claim 1 wherein the polymer is polyethylene terephthalate.

References Cited

UNITED STATES PATENTS

| | | | |
|---|---|---|---|
| 3,293,258 | 12/1966 | Siegrist et al. | 260—307 |
| 3,336,330 | 8/1967 | Schinzel et al. | 260—307 |
| 3,400,124 | 9/1968 | Okubo et al. | 260—240 |
| 3,494,919 | 2/1970 | Collins et al. | 260—240 |
| 3,501,490 | 3/1970 | Maeder et al. | 260—307 |
| 3,575,996 | 4/1971 | Liechti et al. | 260—307 |
| 3,653,943 | 4/1972 | Kaempfen | 117—33.5 |

DONALD E. CZAJA, Primary Examiner

R. A. WHITE, Assistant Examiner

U.S. Cl. X.R.

260—45.8 NZ, 75 N